United States Patent [19]
Campbell

[11] Patent Number: 5,992,475
[45] Date of Patent: Nov. 30, 1999

[54] AEROSOL-CONTAINER EVACUATING SYSTEM

[76] Inventor: Michael C. Campbell, 516 Colonial Ave., Norfolk, Va. 23507

[21] Appl. No.: 09/119,239

[22] Filed: Jul. 21, 1998

[51] Int. Cl.[6] ........................................ B65B 31/04
[52] U.S. Cl. .............................. 141/65; 141/329; 222/5; 222/83.5; 96/135; 96/136
[58] Field of Search ..................... 141/8, 65, 329, 141/330, 351, 352, 353, 354, 355, 356, 357, 339; 222/5, 80, 81, 82, 83, 83.5, 85, 86, 87, 88, 89, 90, 91; 588/249; 96/117.5, 135, 136, 154; 55/350.1

[56] References Cited

U.S. PATENT DOCUMENTS

| | | |
|---|---|---|
| 3,358,883 | 12/1967 | Loe . |
| 3,828,976 | 8/1974 | Sidelinker . |
| 3,926,340 | 12/1975 | Tygenhof . |
| 4,349,054 | 9/1982 | Chipman et al. . |
| 4,407,341 | 10/1983 | Feldt et al. . |
| 4,968,333 | 11/1990 | Ellis et al. ............................ 55/341.1 |
| 5,088,526 | 2/1992 | Nash ........................................... 141/1 |
| 5,114,043 | 5/1992 | Collins, Jr. . |
| 5,180,462 | 1/1993 | Isaac . |
| 5,265,762 | 11/1993 | Campbell et al. . |
| 5,271,437 | 12/1993 | O'Brien et al. . |
| 5,284,997 | 2/1994 | Spearman et al. . |
| 5,285,827 | 2/1994 | Gonzales-Miller et al. .............. 141/65 |
| 5,309,956 | 5/1994 | Hajma . |
| 5,365,982 | 11/1994 | O'Neill . |
| 5,546,995 | 8/1996 | Van Etten .................................. 141/7 |
| 5,613,534 | 3/1997 | Nickens et al. ........................... 141/51 |
| 5,826,631 | 10/1998 | Gold et al. ................................. 141/1 |
| 5,918,649 | 7/1999 | Johse ....................................... 141/330 |

*Primary Examiner*—Henry J. Recla
*Assistant Examiner*—Peter deVore
*Attorney, Agent, or Firm*—Griffin, Butler, Whisenhunt & Szipl, LLP

[57] ABSTRACT

An evacuating kit (10) having a puncturing device (14) for evacuating aerosol cans into a drum (12), on which the puncturing device is mounted at a first bung hole (36), also includes a filter canister (16) for being coupled to a second bung hole (77) of the drum by a flexible transfer hose (20) so that the filter canister can be supported by a floor supporting the drum. The puncturing device further includes a valve at a second end (32) of a tubular wall (23) of a housing (22) of the puncturing device with a valve poppet (50) positioned beyond the second end for opening and closing a second-end opening (28) using the second end of the housing as a valve seat. The valve has a valve stem (48) mounted for linear movement in a web (44) of the housing extending across the second opening. The stem includes circumferentially spaced stem fingers (56) for contacting a pressurized container being punctured to open and close the valve poppet. A can holding mechanism includes a plate (60) slideably mounted on the housing and a screw clamp mounted on the plate with a convex rounded surface (76) for contacting concave bottoms of aerosol cans.

23 Claims, 3 Drawing Sheets

94 Indicating carbon cartridge
90 Adhesive filter media
88 Activated carbon
Filter media
Activated carbon
Filter media
Activated carbon
Filter media

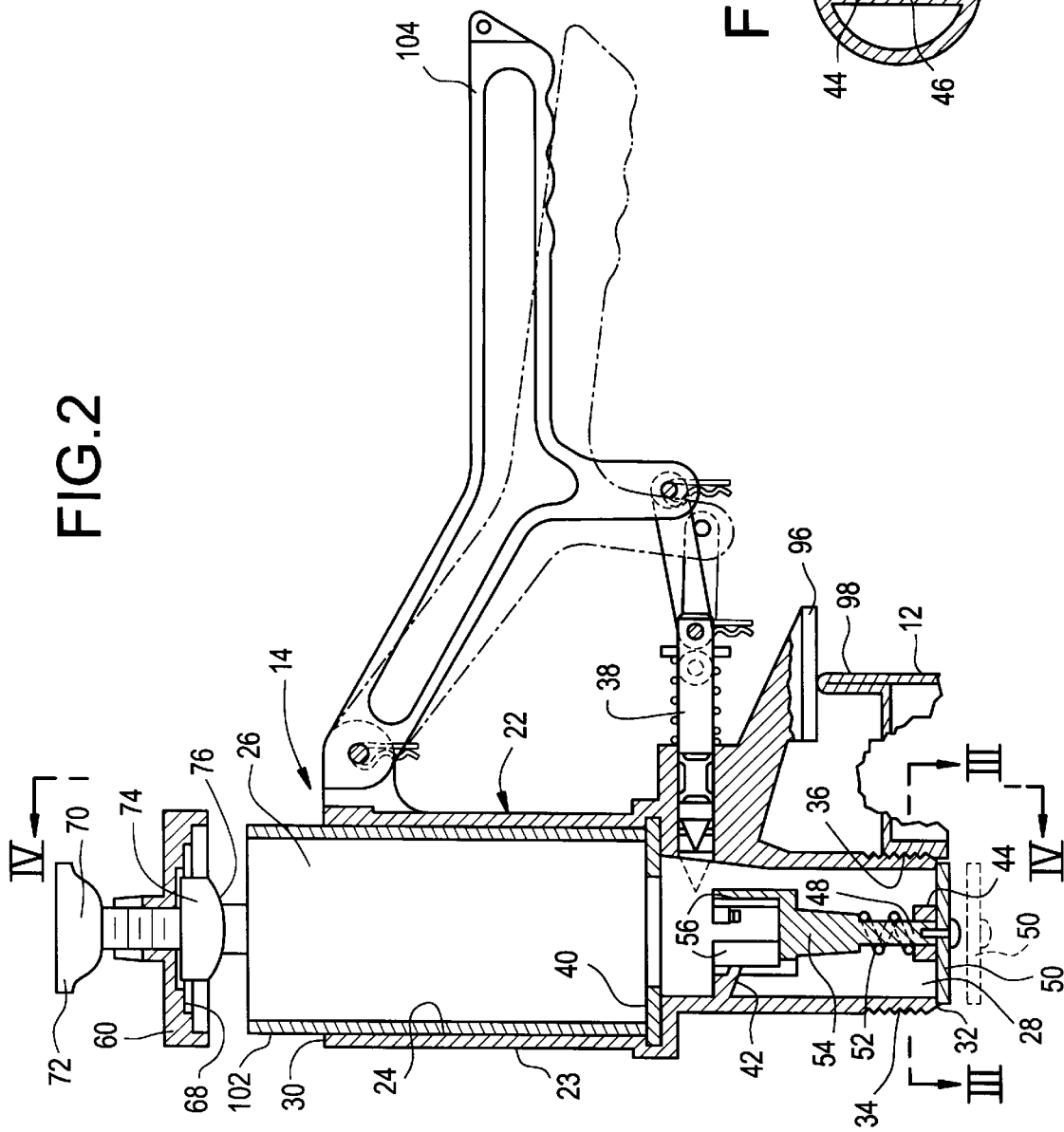
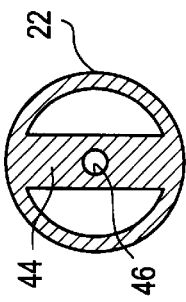

AEROSOL-CONTAINER EVACUATING SYSTEM

BACKGROUND OF THE INVENTION

This invention relates generally to the art of waste disposal, and more specifically to devices and systems for relieving, or evacuating, aerosol cans of pressurized propellant gases and residue contents in preparation for disposing or recycling the cans.

Pressurize aerosol cans, and other pressurize containers, have widespread usage in homes and industry. It has long be recognized that improper disposal of such containers constitutes a safety hazard in that excessive external heat and/or pressure can cause them to explode if they have not been relieved of internal pressure. Similarly, release of contents, both propellant gases and dangerous residue materials, from such containers often damages the environment.

Due to these hazards, the Environmental Protection Agency (EPA), an Agency of the US government, regulates disposal of pressurized containers as well as their contents for industries. These regulations mandate that certain businesses and industries must puncture all pressurize containers prior to their disposal. Further, these regulations require that certain contents of pressurize containers be captured and disposed of in particular manners. Depending upon the natures of such contents, disposal methods can involve permanent disposal through incineration, landfills or other means; treatment and permanent disposal; treatment and recycling; and treatment and reclamation for a new use. An example of reclamation would be recovering a solvent contained in waste paint for use as a fuel. But, whichever disposal method is used, the EPA requires many industries to relieve the pressure in pressurize containers prior to transporting them for disposal.

In addition to the above requirement of the EPA, many states within the United States and countries outside the United States have requirements similar to, or even stricter than, those of the EPA. For example, California closely regulates release of gases into the atmosphere. In this respect, California considers some propellants used in aerosol cans to be contaminants, particularly when they contain small aerosolized particles of materials, such as insecticides, paints, and the like, which were in the aerosol cans.

There have been a number of prior-art devices suggested for piercing pressurized containers described in U.S. and foreign patents. Probably, the most widely used of such devices is described in U.S. Pat. No. 5,265,762 to Campbell et al. This Campbell et al. patent describes a puncturing device for aerosol containers which includes an elongated tubular housing having male threads at a second end for being screwed into a first, or large, bung-plug hole (bung hole) of an off-the-shelf drum, such as a 15, 30 or 55 gallon drum. An aerosol can to be disposed of is inserted in a first opening at a first end of the cylindrical housing, nozzle-end-first, until a shoulder of the aerosol can engages a sealing shoulder in the elongated tubular housing. A puncturing device mounted on the side of the housing is driven through the housing to puncture the aerosol can above its nozzle valve (which is directed downwardly), but below the sealing shoulder of the elongated tubular housing. Propellant gas and residue material from the aerosol can are driven by pressure of a propellant gas in the can out of a second end opening of the housing into the drum. The sealing shoulder prevents the propellant gas and residue from retro-movement toward the first end opening of the housing (which opens to the environment) and ensures that these materials go into the drum.

The Campbell et al. (U.S. Pat. No. 5,265,762) also describes an aerosol-container reliever system which further includes a filter screwed into a second, or small bung opening, of the drum for filtering propellant gases escaping from the second bung opening of the drum so as to clean such escaping gaseous vapors of atmosphere-harmful materials.

Other patents which describe devices and systems relating to the system described in Campbell et al. (U.S. Pat. No. 5,265,762) include U.S. Pat. Nos.:

3,358,883 to Loe; 3,828,976 to Sidelinker; 3,926,340 to Tygenhof; 4,349,054 to Chipman et al.; 4,407,341 to Feldt et al.; 5,114,043 to Collins, Jr.; 5,181,462 to Isaac; 5,271,437 to O=Brien et al.; 5,284,997 to Spearman et al.; 5,309,956 to Hajma; 5,365,982 to O=Neill.

Although some of the devices and systems described in these various prior-art patents have some advantages, there are several existing shortcomings which these prior-art devices and systems do not overcome.

One problem not adequately addressed by these prior-art patents is that propellant gases can escape from most of their housings once punctured aerosol cans have been removed from the housings. There is no adequate structure described in the prior art for correcting this.

One of the above-mentioned patents, namely Isaac (U.S. Pat. No. 5,181,462), describes a system (see FIG. 6 of that patent) in which a can to be punctured is pressed against a valve stem for opening a valve through which propellant gases and residue is expelled. In the device of Isaac, once the can is removed, the valve is biased to close and prevent escape of collected fluids. However, the valve described in Isaac is relatively expensive to construct, is difficult to integrate with the rest of Isaac's housing, and has a valve seat which greatly restricts evacuation flow of propellant fluids and residue.

Thus, it is an object of this invention to provide a valve on a housing for an aerosol can puncturing device which prevents backflow of propellants and residue but which can be easily integrated into the housing, is relatively inexpensive to construct, is effective in use, does not unduly restrict flow of propellants and residue, and can be used when the housing is screwed into a drum bung hole.

Yet another difficulty with the prior-art described above is that none of the devices described therein has an adequate mechanism for holding a can while the can is being pierced. In this regard, a number of these prior-art patents do describe mechanisms for holding cans while they are pierced; for example, Campbell et al. (U.S. Pat. No. 5,265,762) describes a Aforce-applying apparatus,@ which is basically a plate mounted on a shaft longitudinally slidable relative to the housing. The plate can be pressed downwardly against a can and the shaft can than be clamped in position relative to the housing so that the plate holds the can tightly against the sealing shoulder. Although this mechanism functions reasonably well, it is difficult for many people to manipulate it to apply a sufficiently great and constant force against the can for adequately driving the can squarely against the sealing shoulder. Thus, in some cases, once the can has been pierced below the sealing shoulder, propellants and residue have escaped pass the sealing shoulder, around the can directly into atmosphere. Thus, it is another object of this invention to provide an inexpensive and easy-to-construct holding mechanism for tightly holding a can in a housing while the can is pierced. It is also an object of this invention to provide such a holding mechanism which positively centers the can being held, thereby ensuring that it is held straight so that its shoulder is flush, or square, on the sealing shoulder of the housing.

Still another shortcoming of the devices and systems described in the above-cited prior-art is that they do not provide a portable kit for evacuating aerosol cans without unduly contaminating the environment. In this respect, Campbell et al. (U.S. Pat. No. 5,265,762) does disclose a puncturing device for aerosol containers which is sold as a kit with a filter, as mentioned above, with the puncturing device and filter to be mounted on a drum at first and second bung holes thereof and propellant gas passing through the drum and filter to atmosphere. However, such a portable filter mounted on a drum has been found to be inadequate for preventing contamination in many cases. Therefore, it is yet another object of this invention to provide a portable aerosol-container evacuating kit which includes a filter which can be coupled with a second bung hole of a drum which adequately cleans propellant gases evacuated from aerosol cans which is effective in use, uncomplicated in structure, relatively inexpensive to construct, and relatively easy to mount and use.

SUMMARY OF THE INVENTION

According to principles of this invention, a device for puncturing a pressurized container received in a first-end opening of an elongated tubular housing wall having male threads at a second-end opening for being screwed into a first bung hole of a drum further includes: a valve at the second-end opening with a valve poppet being positioned beyond a portion of a second end for moving away from the portion of the second end for opening and closing the second-end opening. The valve poppet has a stem mounted for linear movement in a web extending across the second opening, the stem including circumferentially positioned stem fingers for contacting a pressurized container being punctured. The portion of the second end of the housing serves as a valve seat for the valve poppet and the poppet does not extend circumferentially beyond an outer diameter of the second end so that it does not obstruct the second end from being screwed into the first bung hole.

A holding mechanism includes a plate slideably mounted on the housing and a screw clamp mounted on the plate for contacting bottoms of aerosol cans. Thus, both the slideable plate and screw clamp are used for pressing the cans against the sealing shoulder. Further, the screw clamp includes a convex pressing member for mating with concave bottoms of aerosol cans for centering the cans.

The device for puncturing a pressurized container is part of a kit including a filter canister for being coupled to a second bung hole of the drum by a flexible conduit and for being supported on a same surface as is supporting the drum, most likely a floor. The filter canister includes an adhesive filter medium as a final stage.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

FIG. 2 is a side-sectional, segmented, enlarged view of the device for puncturing pressurized containers of FIG. 1 mounted on the drum;

FIG. 3 is a cross-sectional view of the device for puncturing pressurized containers of FIG. 2, taken on line III—III in FIG. 2;

DESCRIPTION OF THE PREFERRED EMBODIMENT

Figure 1:
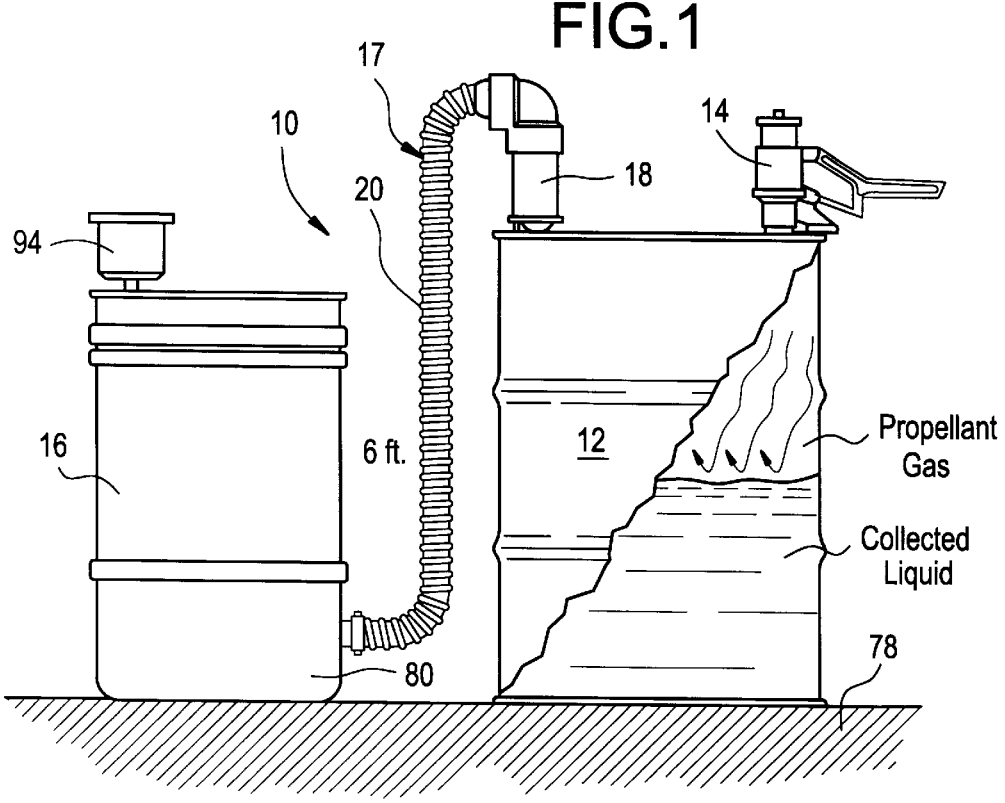
FIG. 1 is a schematic, partially cutaway, side view of a kit of this invention, including a device for puncturing pressurized containers, a canister filter system, and a conduit system, mounted on a drum.

FIG. 1 depicts a portable aerosol-container evacuating kit 10 being used with a 55-gallon drum 12 (although other size drums could also be used). The evacuating kit 10 comprises a puncturing device 14 for puncturing a pressurized container, a filter canister 16, a conduit system 17, and a coalescing filter 18.

The 55-gallon drum 12 is an off-the-shelf item which can be, and normally is, purchased independently of the evacuating kit 10. However, it can also be provided and sold in a kit including all of the elements depicted in FIG. 1.

The puncturing device 14 has a great deal of similarities with the puncturing device described in U.S. Pat. No. 5,265,762 to Campbell at al., and the disclosure in that patent is incorporated herein by reference for any elements which are not specifically described in detail herein. Basically, the puncturing device 14 comprises a housing 22 with an elongated tubular wall 23 defining an elongated cavity 24 with first and second openings 26 and 28 at first and second ends 30 and 32 thereof. An aerosol can (not shown) is received, valve-end-first, in the first opening 26. Male threads 34 are located on an outer surface of the tubular wall 23 immediately adjacent the second end 32 which are appropriate for being screwed into a large bung hole 36 of the drum 12, which will be hereinafter referred to as the first bung hole 36.

As can be seen in FIG. 2, a puncturing pin 38 passes through the tubular wall 23 of the housing 22 below a sealing shoulder 40 and above stop-shoulder elements 42.

The housing 22 is molded as one part and included therewith, as one part, is a web 44 which is formed, at its opposite ends, onto the tubular wall 23 of the housing 22, as can be seen in FIG. 3, so as to extend across a diameter of the second opening 28. A surface of the web 44 directed in the same direction as the second end 32 is, in the embodiment depicted in FIG. 2, flush with the second end 32. There is a valve-mounting hole 46 in the web 44.

A valve stem 48 passes through the valve-mounting hole 46 of the web 44 and is screwed to a valve poppet 50 at its end facing in the same direction as the second end 32. A compression spring 52 is mounted about the stem 48 so as to press against the web 44 at a bottom end and against a valve-stem enlargement 54 at a top end. The spring 52 thereby urges the valve stem 48 upwardly, as viewed in FIG. 2, and pulls the valve poppet 50 against a portion of the second end 32 of the tubular wall 23 of the housing 2. Thus, this portion of the second end 32 serves as a valve seat for the valve poppet 50.

The valve stem enlargement 54 includes circumferentially spaced valve-stem fingers 56, with the stop shoulder elements 42 of the housing 22 being positioned in angular, groove-like, spaces between the valve-stem fingers 56. It should be noted that these groove-like spaces between the valve-stem fingers 56 allow the valve stem and the valve-stem enlargement 54 to be inserted into the cavity 24 of the tubular wall 23 from the first opening 26 past the stop-shoulder elements 42.

The valve poppet 50, in the depicted embodiment, is a TEFLON circular disc which has an outer diameter greater than a diameter of the second opening 28, but less than an outer diameter of tubular wall 23 at the second end 32. Further, when in operation, the valve poppet 50 is normally positioned beyond the second end 32, at least that portion of the second end 32 forming the valve seat for the valve poppet 50.

Figure 4:
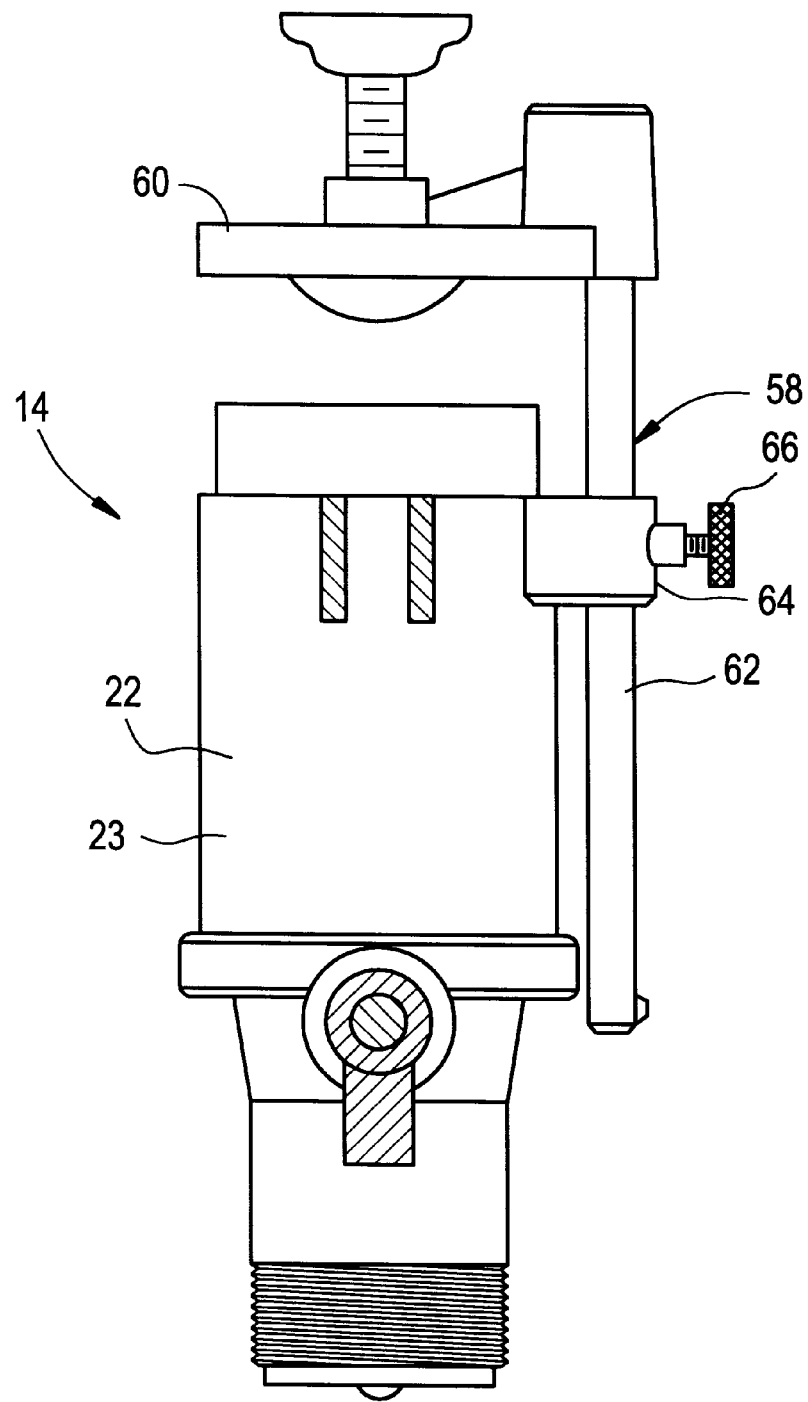
FIG. 4 is a side-view of the device for puncturing a pressurized container of FIG. 2 taken at an angle 90° from the view shown in FIG. 2, on line IV—IV in FIG. 2.

As can be seen more clearly in FIG. 4 than in FIG. 2, the puncturing device 14 further includes a can-holing mechanism 58 which comprises a plate, or cover, 60 affixed to a shaft 62 which, in turn, is slideably mounted in a sleeve 64 molded on an outside of the tubular wall 23. A set screw 66 on the sleeve 64 allows an operator to clamp and release the sleeve 64 to and from the shaft 62 so that the shaft 62 can be rotated and move longitudinally in the sleeve 64 and clamped at desired positions. Thus, the plate 60 can be rotated into and out of alignment with the first opening 26 as well as moved toward and away from the first opening 26. The shaft 62 has a stop thereon to prevent its removal from the sleeve 64 and, in one embodiment, it has a number of indentations and/or holes therein into which the set screw can more positively engage for holding the shaft 62 more firmly. A bottom surface 68 of the plate 60 defines a cavity with stepped diameters for engaging bottom outer-rim edges of various size aerosol cans.

That portion of the can-holding mechanism 58 described above was basically also disclosed in U.S. Pat. No. 5,265,762 to Campbell et al. When using the device, as described in that patent, the set screw 66 was loosened and the plate 60 was placed in alignment with the first opening 26. A bottom end of a can being evacuated was fitted in the proper-diameter step on the bottom surface 68 of the plate 60, and the plate 60 was pressed downwardly to urge the can against the sealing shoulder 40 and/or the stop-shoulder elements 42. However, after much experimentation, it has been determined that such a can-holding mechanism is not always sufficient by itself. Thus, a threaded-screw clamp 70 having a threaded shaft extending through, and engaging with, a threaded hole in the plate 60, has been added to the can-holding mechanism 58. The threaded-screw clamp 70 has a hand knob 72 at an upper end thereof and a pressing member 74 at a lower end thereof. The pressing member 74 has a rounded, convex, lower surface 76 facing away from the knob 70 for being urged into rounded concave bottoms of aerosol cans for simultaneously centering the cans and urging them positively toward the sealing shoulder 40.

The canister 16, sometimes referred to as a carbon canister drum, has a nominal capacity of 30 U.S. gallons, thus, it is only slightly smaller than the 55 gallon drum 12. As can be seen in FIG. 1, both the drum 12 and the canister 16 are structured to be supported by the same supporting surface 78, which will usually be a floor of a building. In this respect, a lower portion of the canister 16 communicates with a second (small) bung hole 77 of the top cover of the drum 12 via the conduit system 17, which includes flexible transfer hose 20. The flexible transfer hose 20 allows the filter canister 16 to be supported by the same supporting surface 78 as the drum 12, however, it also allows the filter canister 16 to be supported by other adjacent structures. Further, it allows the filter canister to be moved circumferentially about the drum 12 for accommodating various room space requirements in which the evacuating kit 10 is used.

The coalescing filter 18 is similar to a coalescing filter described in U.S. Pat. No. 5,284,997 to Spearman et al. In this regard, Spearman et al. discloses a two-stage filter which comprises a first-stage coalescing filter and a second-stage carbon filter mounted on the coalescing filter. The entire two-stage filter is supported by a drum similar to the drum 12 for use in evacuating aerosol cans. In the Spearman et al. Arrangement, second stage filter material includes carbon held between a porous top filter member and a porous bottom support member. However, this second-stage filter is omitted from the coalescing filter 18 of this invention and instead there is mearly a cavity, or plenum, 82 where the carbon filter of Spearman et al. is located.

Basically, a coalescing element 84 of the coalescing filter 18 separates and removes liquid droplets and solids from gaseous contents of aerosol containers, with remaining gases and liquids being driven into the cavity 82 and from there through the transfer hose 20 downwardly into the lower portion 80 of the filter canister 16.

Figure 5:
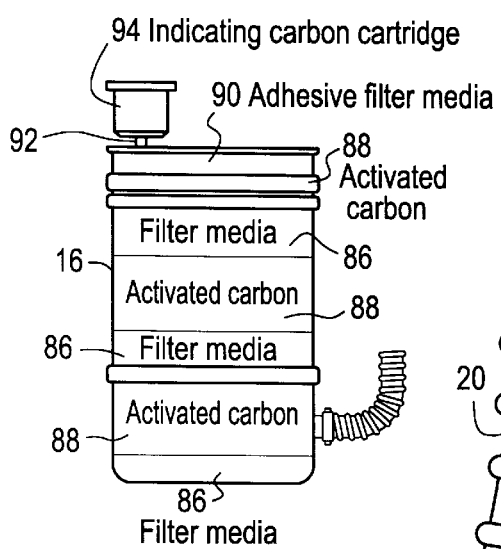
FIG. 5 is a side-view of the canister filter of the kit of FIG. 1 with labels thereon showing contents thereof.

The filter canister 16, as can be seen in FIG. 5, is alternately filled with three porous, fiber, filter media beds 86 and activated carbon beds 88. In addition, there is a final adhesive filter medium 90 at the very top of the filter canister 16.

Each of these filter media beds 86 is comprised of two-inch blended dual-denier fibers which are stacked to form the bed 8–10 inches thick.

Each of the carbon beds 88 is formed of pelletized activated carbon. This activated carbon removes hazardous solvents from the propellant gaseous mixture by retaining them in pores within the carbon. The filter media 86, on the other hand, removed particle and droplets of liquid carried with the propellant gases.

Finally, the adhesive filter medium 90 is formed of a two-inch blended dual denier fiber which has a pressure-sensitive dry tack adhesive on its exit side for adhering to any remaining particles, such as dust or liquid residue, before any remaining propellant is released to atmosphere through a hole 92 in a top cover of the filter canister 16. In this respect, the remaining gases are released to atmosphere through an indicating carbon cartridge 94 which changes color if the released gases contain contaminating material.

In use, the evacuating kit 10 is normally sold as a unit, with replacement puncturing devices 14 and filter canisters 16 (with their associated conduit system 17) also being sold separately. The following description refers to use of one evacuating kit 10.

A puncturing device 14 of the evacuating kit 10 is mounted on the off-the-shelf 55 gallon drum 12 by screwing the male threads 34 of the tubular wall 23 of the housing 22 into the large, or first, bung hole 36 of the top cover of the drum 12. The puncturing device 14 is screwed into the first bung hole 36 until an auxiliary support member 96 thereof rests against a raised rim 98 of the drum 12, as is shown in FIG. 2.

Figure 6:
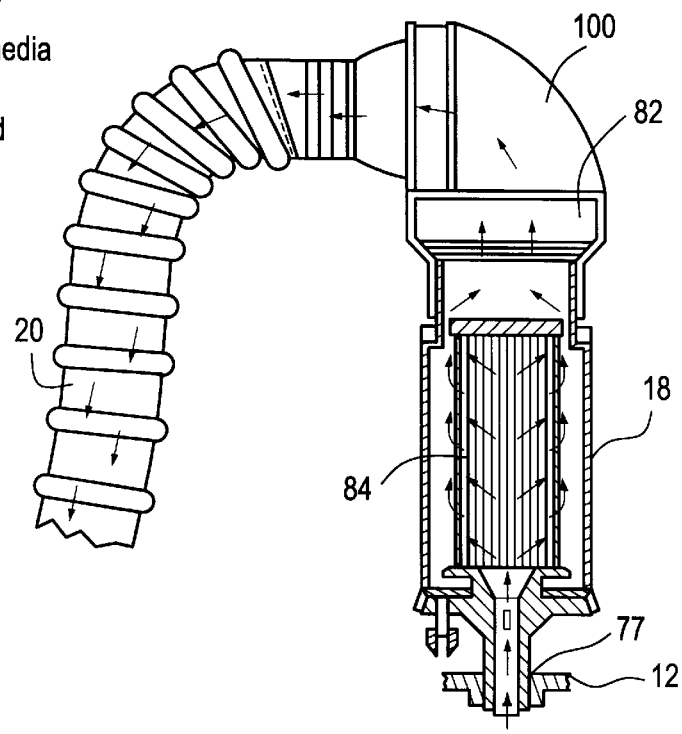
FIG. 6 is a segmented, partially-cutaway, side view of a coalescer and conduit coupling of the kit of FIG. 1 with a drum.

Similarly, the coalescing filter 18, which is at first unattached to the transfer hose 20, is screwed into the small, or second, bung hole 77 of the drum 12, as is shown in FIG. 6. In this respect, most off-the-shelf drums have large and small bung holes.

Thereafter, a plenum member 100, which defines the cavity 82, is snapped onto to a top end of the coalescing filter 18. The plenum member 100 forms a part of the transfer hose 20 and is made so that it can rotate about the coalescing filter 18. The transfer hose 20, in one embodiment is formed of a helix-wire supported PVC plastic cover with a 2-inch internal diameter. The other end of the transfer hose 20 is attached to a male inlet 2-inch hose barb at the lower portion 80 of the filter canister 16. Both the drum 12 and the filter canister 16 are supported on the floor 78 side-by-side. The indicator carbon cartridge 94 is mounted at a top cover of the filter canister 16.

Assuming that it is desired to dispose of an aerosol can, the plate 60 is rotated away from the first opening 26 in the tubular wall 23 of the housing 22 of the puncturing device 14 and the aerosol can is inserted into the first opening 26, valve-end-first. It is desirable that the aerosol can be centered in the tubular wall 23 as much as possible, and, to this end, a resinous plastic sleeve(s) 102 is included with the puncturing device 14 for adapting the puncturing device to various size aerosol cans.

In any event, once the aerosol can is inserted in the first opening 26, the plate 60 is rotated so that it is aligned with the first opening 26, as well as with a bottom end of the aerosol can that was inserted through the first opening 26. The plate 60 and the attached shaft 62 are then sled downwardly, as viewed in FIG. 2, toward the bottom end of the aerosol can until its stepped bottom surface 68 engages the bottom of the aerosol can. The plate 60 is manually shoved against the aerosol can, driving a top shoulder of the aerosol can against the sealing shoulder 40 and, depending upon the size of the aerosol can, possibly also against the stop-shoulder elements 42. When this is done, the top end, or the valve end, of the aerosol engages the valve-stem fingers 56 and thereby presses the valve poppet 50 away from the second end 32 of the tubular wall 23, as is shown in dashed lines in FIG. 2. Thus, the valve 50 has now uncovered the second opening 28 of the tubular wall 23. With the plate 60 manually pressed downwardly, as described above, the set screw 66 is tightened on the shaft 62 of the can-holding mechanism 58 so as to hold the plate 60 in this position. Although the plate 60, in this position, holds the aerosol can against the sealing shoulder 40, it does not do so with sufficient stability to ensure that there will be a proper seal between the aerosol can and the sealing shoulder 40. Thus, the hand knob 72 is rotated to drive the pressing member 74 of the threaded-screw clamp 70 downwardly, with the rounded surface 76 of the pressing member 74 pressing against the rounded concaved bottom of the aerosol can. In this regard, most aerosol cans have rounded concaved bottoms. When the rounded convex surface 72 of the pressing member 74 presses against the rounded concaved bottom of the aerosol can they cooperate to center the aerosol can in the cavity of the tubular wall 23 while maintaining constant and great pressure against the aerosol can for sealing the shoulder of the aerosol can against the sealing shoulder 40. The operator now has free hands to press downwardly on a handle 104 for driving the puncturing pin 38 into the aerosol can below the seal of the aerosol can with the sealing shoulder 40. Propellant and residue from the aerosol can are driven out of the second opening 28 about the valve poppet 50 into the drum 12. Most liquids gather in the drum 12 as is depicted in FIG. 1, but propellant gas, with residue droplets and dust, are driven further through the coalescing filter 18 where additional liquid is extracted from the propellant gas. This propellant gas is driven still further, by its own pressure, through the transfer hose 20 into the lower portion 80 of the filter canister 60 where it alternately passes through filter media beds 86 and activated carbon beds 88 and finally through the adhesive filter medium 90 and the indicating carbon cartridge 94.

The filter canister 16 is sufficiently large that by the time the propellant gas reaches the indicating carbon cartridge 94 its pressure is about spent. Thus, aside from the fact that the filter-media and activated-carbon beds inside the filter canister 16 filter out particulate and gaseous contaminants, propellant pressure from one aerosol can is hardly sufficient for driving particles and droplets throughout the entire system. Thus, propellant from each aerosol can disposed of is usually contained within the drum 12 and the canister 16 immediately after an aerosol can is evacuated so that any liquid or dust remaining will have additional time to settle and contact filter elements. Further, the adhesive filter medium 90 adheres to any particulate matter left in the propellant gas before it passes to atmosphere.

Finally, the threaded screw clamp 70 and the set screw 66 are released and the plate 60 is raised and rotated out of alignment with the first opening 26. When this happens, the spring 52 automatically closes the valve poppet 50 against the second end 32 of the tubular wall 23 and also drives the aerosol can upwardly. The aerosol can is then manually removed from the first opening 26 and this cycle is repeated with a new aerosol can to be evacuated, as desired.

It is beneficial that the valve poppet 50 is located beyond at least a portion of the second end 32 of the tubular wall 23 and that it uses the second end 32 as a valve seat. In this manner, no special additional valve seat need be formed and the valve seat does not restrict the diameter of the second opening 28, which would, in turn, restrict flow of propellant and residue. Thus, an internal surface of the tubular wall defining the second opening 28 can be smooth-cylindrical, with no protruding valve seat. Further, it is beneficial that the valve poppet 50, itself, has a diameter dimension which is between the inner and outer diameters of the tubular wall 23 because, in this manner, the valve poppet 50 does not obstruct the tubular wall 23 from being screwed into the first bung hole 36.

It is also beneficial that the valve is mounted on a single diametrically-positioned web 44 and that the diametrical-positioned web has a surface which is flush with the surface of the second end 32. Such a web can be easily molded as one piece with the housing 22 and provides a simple method of mounting the valve poppet so that it is held in firm alignment with the second end 32 of the tubular wall 23 for seating on only an inner portion thereof.

Another benefit of this invention is that the threaded-screw clamp 70 provides a positive and constant pressure against an aerosol can to be pierced and its convex rounded surface 76 of its pressing member 74 cooperates with concaved bottoms of aerosol cans for centering the aerosol cans. These features combine to securely seal shoulders of aerosol cans against the sealing shoulder 40 while an operator has his hands free for piercing the cans.

Another tremendous benefit of this invention is provided in that the filter canister is no longer mounted directly on the drum 12 but rather is connected thereto by a flexible transfer hose. In this manner, the filter canister 16 can be constructed to have a large capacity size, which in most cases will be greater than half the size of the drum 12 and can be supported on the same floor as supports the drum 12. By making the filter canister to have a much greater capacity than prior filter canisters, a capacity for receiving propellant gas from aerosol cans is increased, thereby reducing the speed at which propellant gases pass through filter elements while usually accommodating a volume of propellant gas from one aerosol can. The filter canister should have a capacity of at least 25 U.S. gallons. This, in turn, increases effectiveness of the filters. It is also a great advantage to have as a last filter stage in the filter canister an adhesive filter medium which adheres to any remaining particulate material before the propellant is released to atmosphere. Also by positioning the adhesive filter medium as the last stage, it catches very few particles and is therefore not fouled too quickly.

The flexible hose 20, along with the plenum member 100, allows the filter canister 16 to assume various positions relative to the drum 12 and also to be supported on the same floor supporting the drum.

The invention claimed is:

1. A device for puncturing a pressurized container for relieving pressure therein and for evacuating gases and residual contents thereof into a collection receptacle, said device comprising:

a housing having a generally elongated tubular wall defining an elongated cavity with first and second openings respectively at first and second ends of the tubular wall, said first opening for receiving a pressurized container at said first end, said housing further including an attachment device for securing said second end of said housing to said collection receptacle for collecting contents expelled from said pressurized container through said second opening at said second end;

a puncturing device mounted on said housing intermediate said first and second ends for piercing said pressurized container in said cavity whereby gases and residual contents thereof are expelled into said collection receptacle through said second opening at said second end;

wherein is further included a valve mounted on said housing for opening and closing said second opening at said second end, said valve comprising a valve poppet positioned at said second end for moving away from a portion of said second end for opening said second opening and for closing on said portion of said second end for closing said second opening.

2. The device as in claim 1 wherein said housing is molded of one piece of material.

3. The device as in claim 2 wherein said housing includes a web extending across said second opening with a recess therein for receiving said valve wherein said valve is mounted on said web by passing through said recess.

4. The device as in claim 3 wherein said web has one surface which is approximately flush with the portion of said second end against which said valve poppet closes.

5. The device as in claim 1 wherein the valve poppet is formed as a resinous plastic disc.

6. The device as in claim 1 wherein said valve includes an valve stem for contacting said pressurized container when said pressurized container is inserted into said first opening and thereby opening said valve poppet.

7. The device as in claim 6 wherein said valve stem includes circumferentially spaced valve-stem fingers for contacting said pressurized container.

8. The device of claim 7 wherein said housing includes stop-shoulder elements extending into said elongated cavity and being spaced from one another circumferentially about said elongated cavity, said stop-shoulder elements being positioned between said circumferentially-spaced valve-stem fingers.

9. The device of claim 1 wherein said attachment device for securing said second end of said tubular wall to said collection receptacle comprises male threads on said tubular wall at said second end, an outer peripheral dimension of said valve poppet being intermediate an inner peripheral dimension and an outer peripheral dimension of said elongated tubular wall at said second end.

10. The device as in claim 9 wherein the valve poppet is formed as a resinous plastic disc.

11. The device as in claim 1 wherein is further included a force-applying device moveably mounted on said housing for engaging said pressurized container positioned in said elongated cavity and forcing said pressurized container toward said second end, wherein said force-applying device comprises a plate which is moveable relative to said tubular wall for positioning said plate adjacent said pressurized container when said pressurized container is inside the elongated cavity and a clamp mounted on said plate, said clamp having a pressing member movable relative to said plate which engages and applies pressure to said pressurized container in said cavity.

12. The device as in claim 11 wherein said clamp includes threads for engaging threads in said plate.

13. A device for puncturing a pressurized container for relieving pressure therein and for evacuating gases and residual contents thereof into a collection receptacle, said device comprising:

a housing having a generally elongated tubular wall defining an elongated cavity with first and second openings respectively at first and second ends of the tubular wall, said first opening for receiving a pressurize container at said first end, said housing further including an attachment device for securing said second end of said housing to said collection receptacle for collecting contents expelled from said pressurized container through said second opening at said second end;

a puncturing device mounted on said housing intermediate said first and second ends for piercing said pressurized container in said cavity whereby gases and residual contents thereof are expelled into said collection receptacle through said second opening at said second end; and wherein is further included a force-applying device moveably mounted on said housing for engaging said pressurized container positioned in said elongated cavity and forcing said pressurized container toward said second end, with said force-applying device comprising a plate moveable relative to said tubular wall for positioning said plate adjacent said pressurized container when said pressurized container is inside the elongated cavity and a clamp mounted on said plate, said clamp having a pressing member movable relative to said plate for engaging and applying pressure to said pressurized container in said cavity.

14. The device as in claim 13 wherein said clamp includes threads for engaging threads in said plate.

15. The device as in claim 14 wherein said pressing member has a convex surface for contacting concaved bottoms of said pressurized containers.

16. The device as in claim 13 wherein said pressing member has a convex surface for contacting concaved bottoms of said pressurized containers.

17. A portable kit for evacuating pressurized containers into an off-the-shelf drum having first and second bung holes, said kit comprising:

a device for puncturing a pressurized container for releasing pressure therein and for expelling gases and residual contents thereof into said drum, said device comprising:

a housing having a generally elongated tubular wall defining an elongated cavity with first and second openings respectively at first and second ends of the tubular wall, said first opening for receiving a pressurize container at said first end, said housing further including male threads for securing said second end of said housing to said first bung hole of said drum for collecting contents expelled from said pressurized container through said second opening at said second end; and a puncturing device mounted on said housing intermediate said first and second ends for piercing said pressurized container in said cavity whereby gases and residual contents thereof are expelled into said drum through said second opening at said second end;

said portable kit further including a gas-cleaning unit for attaching to said second bung hole, said gas-cleaning unit comprising:

a filter canister for being coupled to said second bung hole of said drum but not being supported by said drum, said filter canister containing gas cleaning elements for cleaning propellant gases expelled from said second bung hole of said drum; and a transfer hose attached to said second bung hole and channeling gases expelled from said second bung hole to a lower portion of said filter canister, said transfer hose being flexible and being of a length for allowing said filter canister to rest on the same support as is supporting said drum.

18. The portable kit as in claim 17 wherein is further included a coalescing filter for attaching said transfer hose to said second bung hole, said coalescing filter having threading engagement with said second bung hole and being supported by said drum.

19. The portable kit of claim 17 wherein is further included an indicating member attached to an outlet of said filter canister for indicating passage of contaminating materials from said filter canister to atmosphere.

20. The portable kit of claim 17 wherein said filter canister includes alternate layers of fibrous filter media and activated carbon.

21. The portable kit of claim 20 wherein a last filter layer includes a dry pressure adhesive for adhering to particles remaining in said propellant gas before said propellant gas is released to atmosphere.

22. The portable kit as in claim 17 wherein said filter canister has a capacity of at least 25 U.S. gallons.

23. The portable kit as in claim 22 wherein said filter canister has a capacity of at least 30 U.S. gallons.

* * * * *